Jan. 4, 1949.   P. H. JOHNSON ET AL   2,458,079
RIGIDIFYING MEANS FOR FLEXIBLE ENDLESS TRACKS
Filed March 4, 1946   2 Sheets-Sheet 1

Jan. 4, 1949.  P. H. JOHNSON ET AL  2,458,079
RIGIDIFYING MEANS FOR FLEXIBLE ENDLESS TRACKS
Filed March 4, 1946  2 Sheets-Sheet 2

INVENTORS
P.H. JOHNSON,
L.W. TRIPP,
BY Baldwin, Wight + Brown
ATTORNEYS

Patented Jan. 4, 1949

2,458,079

UNITED STATES PATENT OFFICE 2,458,079

RIGIDIFYING MEANS FOR FLEXIBLE ENDLESS TRACKS

Philip Henry Johnson and Leonard William Tripp, Hounslow, England, assignors to Roadless Traction Limited, Hounslow, Middlesex, England Application March 4, 1946, Serial No. 651,791
In Great Britain December 12, 1944

10 Claims. (Cl. 305—10)

It is known that tracks of the locked girder type, that is, in which the links have mutually engaging abutments preventing hinging into reverse curvature, have advantages on vehicles requiring to move over soft ground. On the other hand, under such conditions there are certain drawbacks with the conventional articulated type of track in which the hinging at the joints is not restrained. Due to the free flexibility of this latter type of track, when rolled upon by widely spaced rollers, the part of the track between the rollers has very little supporting effect and therefore there is considerable sinkage in the soft ground, especially in the case of heavy vehicles, such as tanks.

The present invention has for its object to provide ready means for converting the freely flexible type of endless track into a track possessing a girdering effect.

According to the invention the flexible type of track is converted wholly or partly into a track of the locked girder type by means of a wedge member secured to each of a plurality of track links and so formed and located between adjacent links as to provide an abutment preventing these links from hinging into reverse curvature. Generally it will be preferred to secure the wedge member detachably to the link so that the track may, when desired, be reconverted to its originally fully flexible condition.

The wedge member may be secured to each link of a consecutive series of links, there being a plurality of such series and, between each series, one or more links being unprovided with a wedge member so as to leave a fully flexible joint. It is desirable to leave such occasionally fully flexible joints so as to provide for absorption of obstacles. For example, the track may be divided into sections of say 4-6 locked joints with one unlocked joint between each section.

The wedge member secured to a link in order to prevent the adjacent link from hinging into reverse curvature may provide the necessary abutment so as to be contacted by any suitable portion of the adjacent link. In some cases, say for instance in the case of such track links as are at present used upon the Churchill tanks, the abutment is advantageously situated so that the spud portion of the adjacent link will bear upon the abutment. In such cases the wedge member may be suitably secured to the top portion of the link, e. g. by means of a screw-bolt.

The wedge member may be constructed in various forms, cast or fabricated. It may comprise a base which is detachably secured to the link, a plurality of upright laterally-extending webs secured at intervals to the base and an abutment piece carried by the webs. A continuous abutment piece may be carried by the webs on one side, for engagement by the adjacent link, and separate relatively short abutment pieces may be carried by the webs on the other side to bear against the link to which the wedge member is detachably secured.

It is not desirable that the structure of the wedge member should be so robust that in the event of excessive stress or shock loads, e. g. on hard ground, the link joints should be called upon to withstand such excessive strain. Accordingly, the wedge member is preferably designed so as to be weaker to withstand excessive stress or shock than the link joints.

The invention is illustrated in the accompanying drawings in which.

Figure 1:
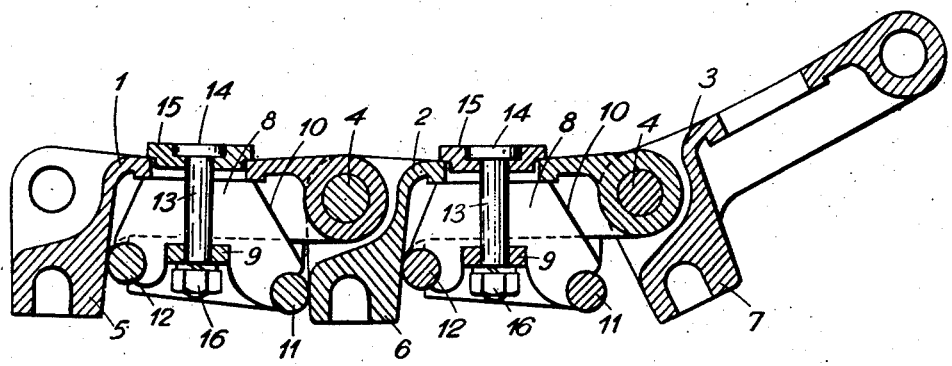
Figure 1 is a longitudinal section of three hinged links of a track.
Figure 2:
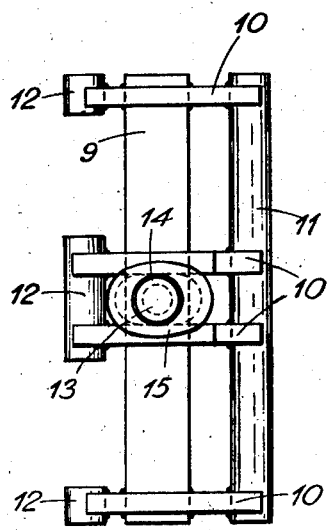
Figure 2 is a plan of the wedge member shown in Figure 1.

Referring to the Figures 1 and 2 of drawings, the successive links are marked 1, 2 and 3 and they are hinged together by hinge pins 4, the spud portions of the links being marked 5, 6 and 7. The links are of a known type and they make up a track which is normally freely flexible. According to the invention wedge members 8 are interposed so as to impose a limit to the flexibility of the hinging i. e. to prevent hinging into reverse curvature.

These wedge members comprise a base 9 to which are welded upright laterally extending webs 10 to which are welded on one side a continuous abutment rod 11 and on the other side relatively short abutment rods 12. The wedge members are secured to the links 1 and 2 respectively by means, in each case, of a screw bolt 13, one end of which has a head 14 accommodated in a recess in a cap 15, and the other end of which passes through the base 9 where it is secured by a nut 16. The cap 15 is oval-shaped and fits an oval hole in the top of the link. The webs 10 bear against the underside of the top of the link so that on tightening the nut 16 the wedge member is securely clamped. When clamped, its abutment rod 12 bear against the spud portion 5 (or 6) of the link to which it is secured. The abutment rod 11 will engage the spud portion 6 (or 7)

of the adjacent link when the latter hinges down to the locking position.

Figure 3:
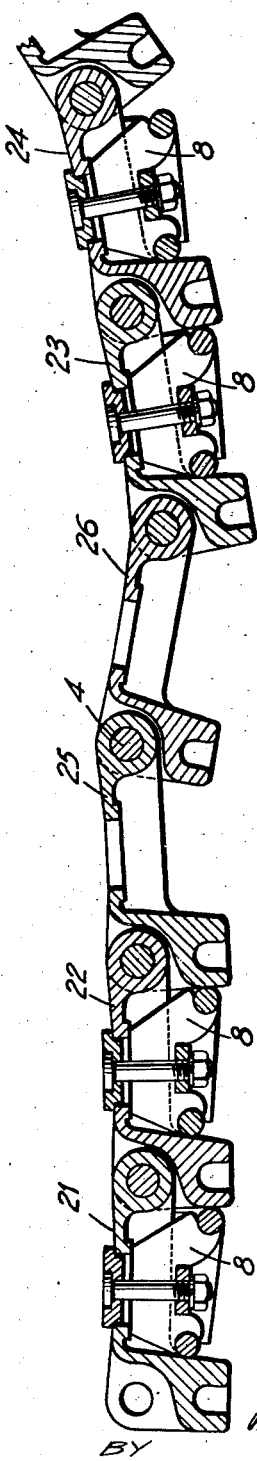
Figure 3 is a longitudinal section of a portion of the length of a track incorporating a modification.

Referring to Figure 3, there are shown four links 21 and 22, 23 and 24, each provided with wedge members 8 in the manner described above. Interposed between the links 22 and 23 are two links 25 and 26 which are not provided with wedge members so that no limit is imposed upon the flexibility of the hinging of these two lengths on their connecting pin 4.

What we claim is:

1. In a flexible endless track including a plurality of links, means converting said track at least partly into an endless track of the locked girder type, comprising a wedge member secured to each of said track links and so formed and located between adjacent links as to provide an abutment preventing these links from hinging into reversed curvature.

2. A converted flexible endless track as claimed in claim 1 in which the wedge member is secured detachably to the link.

3. A converted flexible endless track as claimed in claim 1 in which a wedge member is secured to each of a consecutive series of links.

4. A converted flexible endless track as claimed in claim 1 in which there is a plurality of series of links to which wedge members are secured and, between each series, at least one link to which a wedge member is not secured.

5. A converted flexible endless track as claimed in claim 1 in which the abutment provided by a wedge member secured to a link is situated so that the spud portion of the adjacent link will contact it in the locking position.

6. In a flexible endless track including a plurality of links, means converting said track at least partly into endless track of the locked girder type, comprising a wedge member secured to the top portion of each of said track links and so formed and located between adjacent links as to provide an abutment preventing these links from hinging into reverse curvature.

7. A converted flexible endless track as claimed in claim 6 in which the wedge member is secured to the link by a screw bolt.

8. In a flexible endless track including a plurality of links, means converting said track at least partly into endless track of the locked girder type, comprising a wedge member secured to the top portion of each of said track links and so formed and located between adjacent links as to provide an abutment preventing these links from hinging into reversed curvature, the said wedge member comprising a base which is secured to the link, a plurality of upright laterally extending webs secured at intervals to said base and an abutment piece carried by said webs.

9. A converted flexible endless track as claimed in claim 8 in which a continuous abutment piece is carried by the webs on one side, and separate relatively short abutment pieces are carried by the webs on the other side.

10. In a flexible endless track including a plurality of links, means converting said track at least partly into an endless track of the locked girder type, comprising a wedge member secured to each of said track links and so formed and located between adjacent links as to provide an abutment preventing these links from hinging into reversed curvature, the said wedge member being designed so as to be weaker to withstand excessive stress than the link joints.

PHILIP HENRY JOHNSON.
LEONARD WILLIAM TRIPP.

REFERENCES CITED

The following references are of record in the file of this patent:

UNITED STATES PATENTS

| Number | Name | Date |
|---|---|---|
| 2,410,739 | Johnson | Nov. 5, 1946 |

FOREIGN PATENTS

| Number | Country | Date |
|---|---|---|
| 41,993 | Denmark | Mar. 26, 1930 |